United States Patent
Hirai (10) Patent No.: US 7,945,151 B2
(45) Date of Patent: May 17, 2011

(54) FOCUS CONTROL METHOD AND UNIT DETERMINING IN-FOCUS LENS POSITION BASED ON READ TIMES OF THE AUTOFOCUS AREAS AND FOCUS LENS POSITION AND TIME

(75) Inventor: Shinya Hirai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 772 days.

(21) Appl. No.: 11/568,433

(22) PCT Filed: Jun. 23, 2006

(86) PCT No.: PCT/JP2006/313037
§ 371 (c)(1),
(2), (4) Date: Oct. 27, 2006

(87) PCT Pub. No.: WO2007/001059
PCT Pub. Date: Jan. 4, 2007

(65) Prior Publication Data
US 2008/0292298 A1 Nov. 27, 2008

(30) Foreign Application Priority Data
Jun. 29, 2005 (JP) .................................. 2005-190505

(51) Int. Cl.
*G03B 3/10* (2006.01)
*G03B 13/34* (2006.01)
*H04N 5/232* (2006.01)
*G02B 27/40* (2006.01)
*G02B 27/64* (2006.01)

(52) U.S. Cl. ........ 396/121; 396/123; 396/127; 348/351; 348/353; 348/354; 250/201.2; 250/201.7

(58) Field of Classification Search .................... 396/121
See application file for complete search history.

(56) References Cited

U.S. PATENT DOCUMENTS 5,005,040 A 4/1991 Norita et al. .................... 396/96
5,396,286 A 3/1995 Ishizuka .................... 348/208.6
(Continued)

FOREIGN PATENT DOCUMENTS

CN 1082292 A 2/1994
(Continued)

OTHER PUBLICATIONS

Chinese Office Action issued on Nov. 28, 2008, concerning the basic Patent Application No. 200680023740.0.

(Continued)

*Primary Examiner* — W.B. Perkey
*Assistant Examiner* — Bret Adams
(74) *Attorney, Agent, or Firm* — Canon U.S.A. Inc., I.P. Division (57) ABSTRACT

A focus control method is provided that performs focus control by sensing a plurality of images of an object while moving a position of a focusing lens and determining in-focus positions in auto focusing areas located at a plurality of positions. The focus control method calculates an in-focus position of the focusing lens based on the focusing lens position at the time of reading an image signal of each of the auto focusing areas and a degree of focused state of each of the auto focusing area that is based on the image signal of each of the auto focusing areas.

11 Claims, 8 Drawing Sheets

U.S. PATENT DOCUMENTS

| | | | |
|---|---|---|---|
| 6,094,223 A | 7/2000 | Kobayashi | 348/354 |
| 6,876,391 B1 * | 4/2005 | Hashimoto | 348/345 |
| 6,970,646 B2 | 11/2005 | Hirai | 396/91 |
| 7,079,763 B2 * | 7/2006 | Hirai | 396/91 |
| 7,391,461 B2 * | 6/2008 | Ogino | 348/345 |
| 2003/0063211 A1 | 4/2003 | Watanabe | 348/345 |
| 2003/0081137 A1 * | 5/2003 | Yamazaki | 348/354 |
| 2004/0051029 A1 | 3/2004 | Hirai | 250/201.2 |
| 2008/0037972 A1 | 2/2008 | Takeda et al. | 396/79 |
| 2008/0131109 A1 * | 6/2008 | Honjo et al. | 396/123 |
| 2009/0185799 A1 * | 7/2009 | Kawarada | 396/125 |

FOREIGN PATENT DOCUMENTS

| | | |
|---|---|---|
| CN | 1496111 A | 5/2004 |
| JP | 1-288820 A | 11/1989 |
| JP | 09-200597 A | 7/1997 |
| JP | 10-041493 A | 2/1998 |
| JP | 2000-324378 A | 11/2000 |
| JP | 2004-140479 | 5/2004 |
| JP | 2004-279721 A | 10/2004 |
| WO | 2005/033764 A1 | 4/2005 |

OTHER PUBLICATIONS

English Translation of Chinese Office Action issued on Nov. 28, 2008.

International Search Report dated Oct. 31, 2006.

Japanese Office Action issued on Aug. 11, 2008, concerning the basic Japanese Patent Appliocation No. 2005-190505.

* cited by examiner

FOCUS CONTROL METHOD AND UNIT DETERMINING IN-FOCUS LENS POSITION BASED ON READ TIMES OF THE AUTOFOCUS AREAS AND FOCUS LENS POSITION AND TIME

CROSS REFERENCE TO RELATED APPLICATION

This application is the National Phase of International Application No. PCT/JP2006/313037 filed Jun. 23, 2006, which designated the U.S., which is based upon and claims the benefit of priority from prior Japanese Patent Application No. 2005-190505, filed Jun. 29, 2005, the entire contents all of which are incorporated herein by reference.

TECHNICAL FIELD

The present invention relates to focus control technique for a case in which AF (auto focusing) areas exist in a plurality of positions on a screen based on image signals obtained using an image sensing element whose charge accumulation timing is differ for the respective AF areas.

BACKGROUND ART

Conventionally an electronic shutter control method referred to as a so-called "rolling shutter" is used, for example, as an image sensing control method of a CMOS-type image sensing element. In an image sensing operation using the rolling shutter, first, a plurality of pixels that were arranged two-dimensionally are scanned sequentially in sectional units such as lines, to read an electric charge from each pixel and reset each pixel. After the lapse of a predetermined time (charge accumulation period or exposure time) that starts immediately after the reset, the plurality of pixels are rescanned in a similar manner to when they were reset, thereby reading a charge from each pixel, and the read charge (image signal) is output. When sensing a moving image, the above described operation is performed in one-frame periods.

Figure 7:
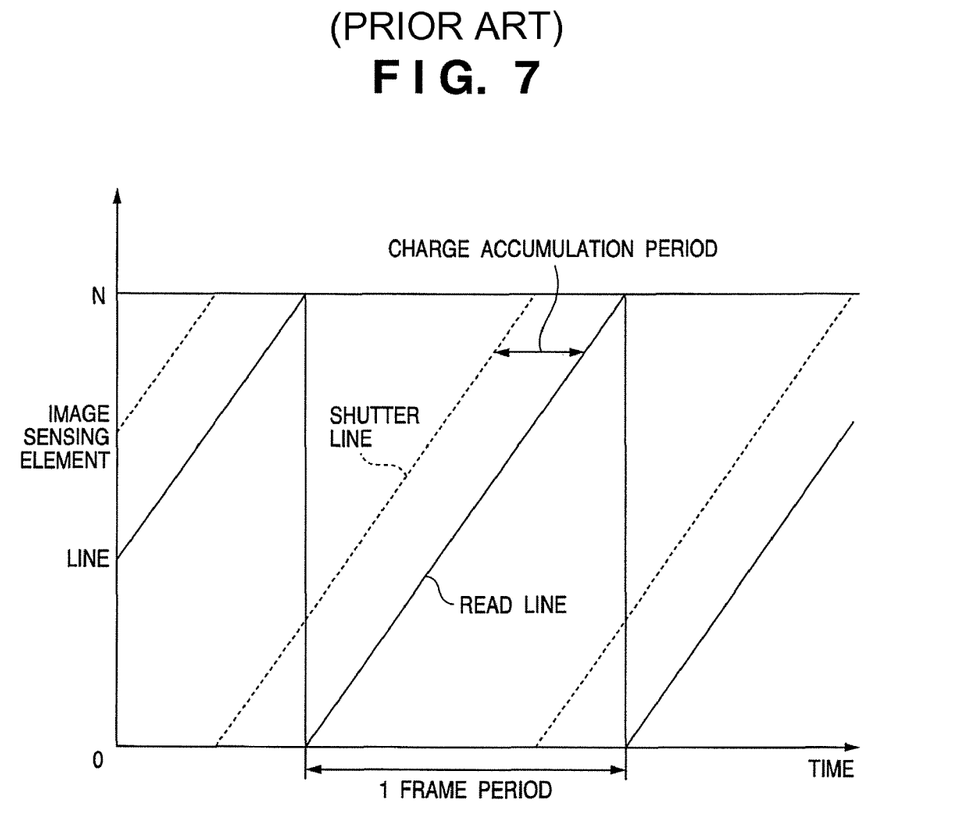
FIG. 7 is a view for illustrating scanning control of an image sensing element according to the conventional rolling shutter.

FIG. 7 is an explanatory diagram that illustrates the concept of this conventional image sensing operation, which shows a case in which scanning was performed by line. The slanting broken line shows the scanning position of the reset line, and the slanting solid line shows the scanning position of the read line of the image signal. Accordingly, the interval between the reset line and the read line is the charge accumulation period.

As will be understood from FIG. 7, when sensing an image using the rolling shutter as described above, there is a time difference of one frame between the timing for scanning the first pixel line and the timing for scanning the last pixel line. More specifically, in an image of one frame, scenes with a time difference between the top and bottom of the frame coexist. Therefore, when controlling an image sensing element using the rolling shutter system to sense a moving object, the image is distorted between the top and bottom of the image.

In order to solve this problem, for example, the method disclosed in Japanese Patent Laid-Open No. 2004-140479 has been proposed. According to this method, first, a reset operation and reading operation are performed at a faster rate than the frame rate, and the image data that was read at a high speed is temporarily stored in a storage unit. Thereafter, the stored data is read out in accordance with the frame rate to thereby lessen image distortion.

Meanwhile, as an autofocusing operation, methods are known that moves a focusing lens to a plurality of positions to perform image sensing in each position, and then determine an in-focus position based on a series of AF evaluation values that are obtained by calculation based on the sensed signals. This type of methods includes a method that performs image sensing after stopping the lens after the focusing lens has been moved, and a method that performs image sensing continuously while moving the lens. Since a problem with the former method is that it requires time since image sensing is performed after waiting for the lens to stop, the latter method is advantageous for speeding up the autofocus.

However, the following problems arise in a case where the latter method is employed when driving an image sensing element whose charge accumulation timings differ for a plurality of AF (auto focusing) areas. More specifically, when acquiring AF evaluation values at a plurality of positions in an image, the position of the focusing lens corresponding to the AF evaluation value of the AF area from which the image signal is first read differs from the position of the focusing lens corresponding to the AF evaluation value of the AF area from which the image signal is last read. As a result, a deviation occurs with respect to the position of the focusing lens that is judged to be in-focus for each AF area.

DISCLOSURE OF INVENTION

The present invention has been made in consideration of the above situation, and has as its object to increase focusing accuracy when performing autofocus control using an image sensing element whose charge accumulation periods differ for a plurality of AF areas while continuously moving a focusing lens.

According to the present invention, the foregoing object is attained by providing a focus control method that carries out focusing control by sensing a plurality of images of an object while moving a position of a focusing lens and determining in-focus positions of auto focusing areas that are located at a plurality of positions, wherein the focus control method calculates an in-focus position of the focusing lens based on a focusing lens position acquired when reading an image signal of each of the auto focusing area and a degree of focused state of each of the auto focusing areas acquired based on an image signal of each of the auto focusing areas.

According to the present invention, the foregoing object is also attained by providing a focus control method that carries out focusing control by sensing a plurality of images of an object while moving a position of a focusing lens and determining in-focus positions of auto focusing areas that are located at a plurality of positions, comprising: a first acquisition step of acquiring read times at which image signals of the respective auto focusing areas are read; a second acquisition step of acquiring a focusing lens position and a time at which the focusing lens position is acquired; a position calculation step of determining focusing lens positions at the read times of the image signals of the respective auto focusing areas based on the read times of the respective auto focusing areas that are acquired in the first acquisition step and the focusing lens position and time that are acquired in the second acquisition step; an evaluation value calculation step of calculating evaluation values that represent degrees of focused states of the respective auto focusing areas based on the image signals of the respective auto focusing areas; and an in-focus position calculation step of calculating an in-focus position of the focusing lens based on the focusing lens positions that are determined in the position calculation step and the evaluation values of the respective auto focusing areas that are calculated in the evaluation value calculation step.

Further, according to the present invention, the foregoing object is also attained by providing A focus control method that carries out focusing control by sensing a plurality of images of an object while moving a position of a focusing lens and determining in-focus positions of auto focusing areas that are located at a plurality of positions, comprising: a first acquisition step of acquiring read times at which image signals of the respective auto focusing areas are read; a second acquisition step of acquiring a focusing lens position and a time at which the focusing lens position is acquired; an evaluation value calculation step of calculating evaluation values that represent degrees of focused states of the respective auto focusing areas based on the obtained image signals; an in-focus position calculation step of calculating in-focus positions of the focusing lens of the respective auto focusing areas based on the focusing lens position acquired in the second acquisition step and the evaluation values of the respective auto focusing areas that are calculated in the evaluation value calculation step; a correction step of correcting the in-focus positions of the respective auto focusing areas based on the read times of image signals of the respective auto focusing areas that are acquired in the first acquisition step, the focusing lens position and time that are acquired in the second acquisition step, and the in-focus positions of the auto focusing respective areas calculated in the in-focus position calculation step; and an in-focus position determination step of determining an in-focus position of the focusing lens based on the in-focus positions that are corrected in the correction step.

Furthermore, according to the present invention, the foregoing object is also attained by providing a focus control unit that carries out focusing control by sensing a plurality of images of an object while moving a position of a focusing lens and determining in-focus positions of auto focusing areas that are set at a plurality of positions, comprising: a controller that controls an in-focus position of the focusing lens based on a focusing lens position acquired when reading an image signal of each of the auto focusing area and a degree of focused state of each of the auto focusing areas acquired based on an image signal of each of the auto focusing areas.

Further, according to the present invention, the foregoing object is also attained by providing a focus control unit that carries out focusing control by sensing a plurality of images of an object while moving a position of a focusing lens and determining in-focus positions of auto focusing areas that are set at a plurality of positions, comprising: a position calculation unit that acquires read times at which image signals of the respective auto focusing areas are read and a focusing lens position and a time at which the focusing lens position is acquired, and determines focusing lens positions at the read times of the image signals of the respective auto focusing areas based on the read times of the auto focusing areas and the focusing lens position and time; an evaluation value calculation unit that calculates evaluation values that represent degrees of focused states of the respective auto focusing areas based on the image signals of the respective auto focusing areas; and an in-focus position determination unit that determines an in-focus position of the focusing lens based on the focusing lens position that is acquired by the position calculation unit and the evaluation values of the respective auto focusing areas that are calculated by the evaluation value calculation unit.

Further, according to the present invention, the foregoing object is also attained by providing a focus control unit that carries out focusing control by sensing a plurality of images of an object while moving a position of a focusing lens and determining in-focus positions of auto focusing areas that are set at a plurality of position, comprising: an acquisition unit that acquires read times at which image signals of the respective auto focusing areas are read and a focusing lens position and a time at which the focusing lens position is acquired; an evaluation value calculation unit that calculates evaluation values that represent degrees of focused states of the respective auto focusing areas based on the obtained image signals; an in-focus position determination unit that determines in-focus positions of the focusing lens of the respective auto focusing areas based on a focusing lens position acquired by the acquisition unit and evaluation values of the respective auto focusing areas that are calculated by the evaluation value calculation unit; and an in-focus position correction unit that corrects the in-focus positions of the respective auto focusing areas based on the read times of the image signals of the respective auto focusing areas and the focusing lens position and time that are acquired by the acquisition unit and an in-focus positions of the respective auto focusing areas that are determined by the in-focus position determination unit, and determines an in-focus position of the focusing lens based on the corrected in-focus positions.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

First Embodiment

Figure 1:
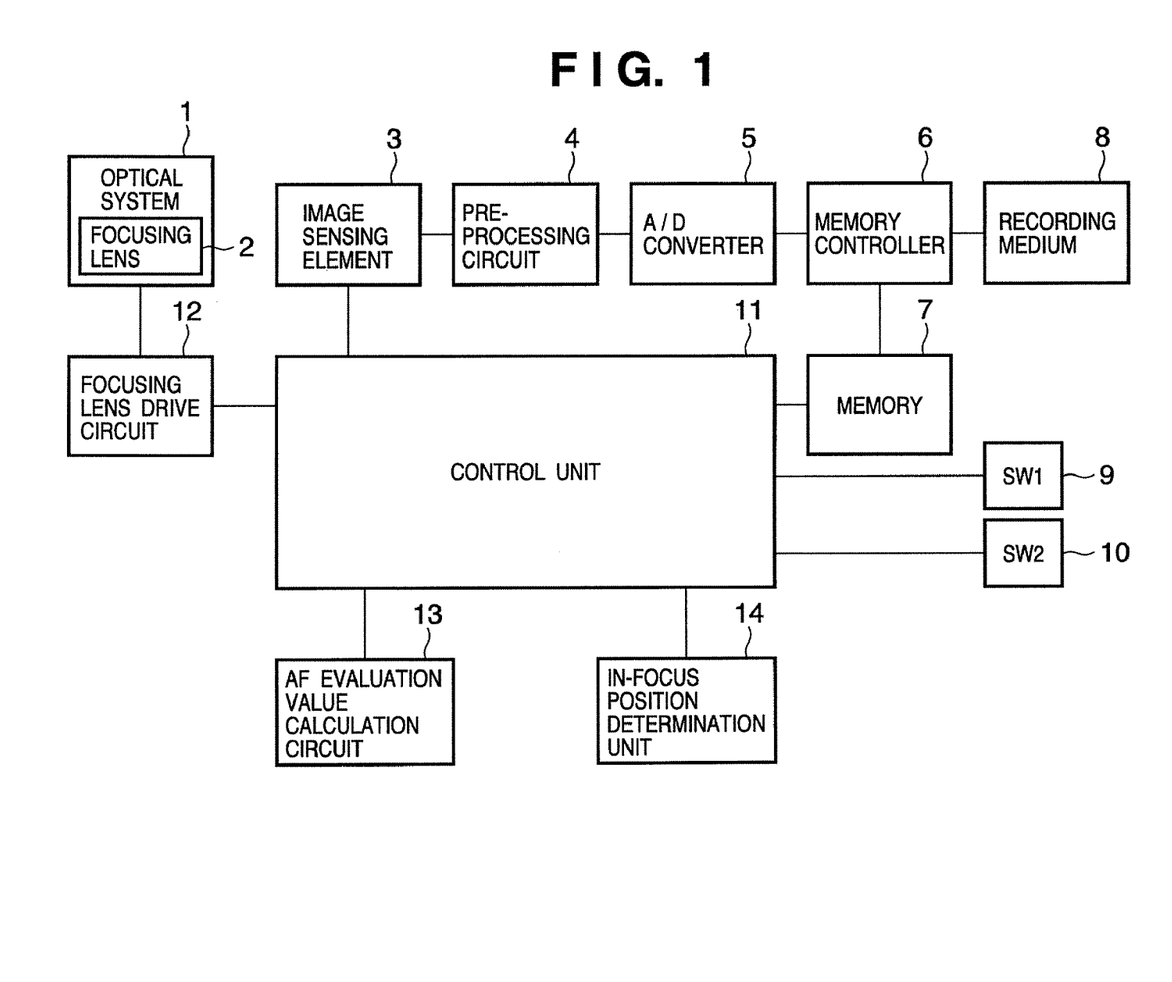
FIG. 1 is a block diagram showing a schematic functional configuration of a digital camera according to an embodiment of the present invention.

FIG. 1 is a block diagram showing a schematic functional configuration of a digital camera that utilizes an autofocus unit having AF areas in a plurality of locations according to an embodiment of this invention.

The digital camera according to the present embodiment has an optical system 1 that includes a focusing lens 2. The digital camera subjects light that was imaged via the optical system 1 to photoelectric conversion by an image sensing element 3 to output the light as an image signal. The image sensing element 3 used in this example is a CMOS sensor or the like, and is driven by a rolling shutter as described above referring to FIG. 7.

An output image signal is digitalized by being passed through a pre-processing circuit 4 that comprises a correlated double sampling (CDS) circuit that removes output noise and a non-linear amplifier circuit that processes the image signal before A/D conversion, and an A/D converter 5. The digitalized image signal is stored in a memory 7 via a memory controller 6, and is recorded on a recording medium 8 after being converted into image data of an arbitrary format by a signal processing circuit (not shown).

Focusing operations are controlled by a control unit 11. The control unit 11 drives the focusing lens 2 via a focusing lens drive circuit 12 and performs image sensing in AF areas located at a plurality of positions while moving the focusing lens 2. Thereafter, using the image signals that were sensed by the image sensing element 3 at each AF area, a signal (AF evaluation value) that shows the focused state is calculated by an AF evaluation value calculation circuit 13 based on the image contrast. Next, after determining the in-focus position on the basis of the calculated AF evaluation value in an in-focus position determination unit 14, the control unit 11 controls the focusing lens 2 to move to the determined in-focus position. In this connection, when a SW1 (9) was operated the above described focusing operation is performed, and when a SW2 (10) was operated the present image sensing and image recording is performed.

In the present embodiment, calculation of AF evaluation values is performed as follows.

First, for luminance signals of image signals within preset AF areas (auto focusing areas) among the image signals obtained from the image sensing element 3, a horizontal bandpass filter is applied for each horizontal line to extract luminance signals of a predetermined frequency component. Next, the luminance signal with the largest absolute value is selected from among the luminance signals that were extracted for each horizontal line, and the selected luminance signals are integrated in the vertical direction. The value obtained by integrating that luminance signals is taken as the AF evaluation value. In this connection, detecting a luminance signal with a large contrast in the horizontal direction and integrating the signal in the vertical direction in this manner leads to an improvement in the signal's S/N ratio. The value of the thus-obtained AF evaluation value is highest in an in-focus state and decreases in a defocus state. Accordingly, a focused image can be obtained by driving the focusing lens 2 to a position at which the AF evaluation value is at a maximum, and then performing image sensing.

Next, autofocus processing for the first embodiment will be described with reference to FIG. 2. In this example, a case is described in which a total of 9 (3×3) AF areas are set in one frame as shown in FIG. 3.

Figure 2:
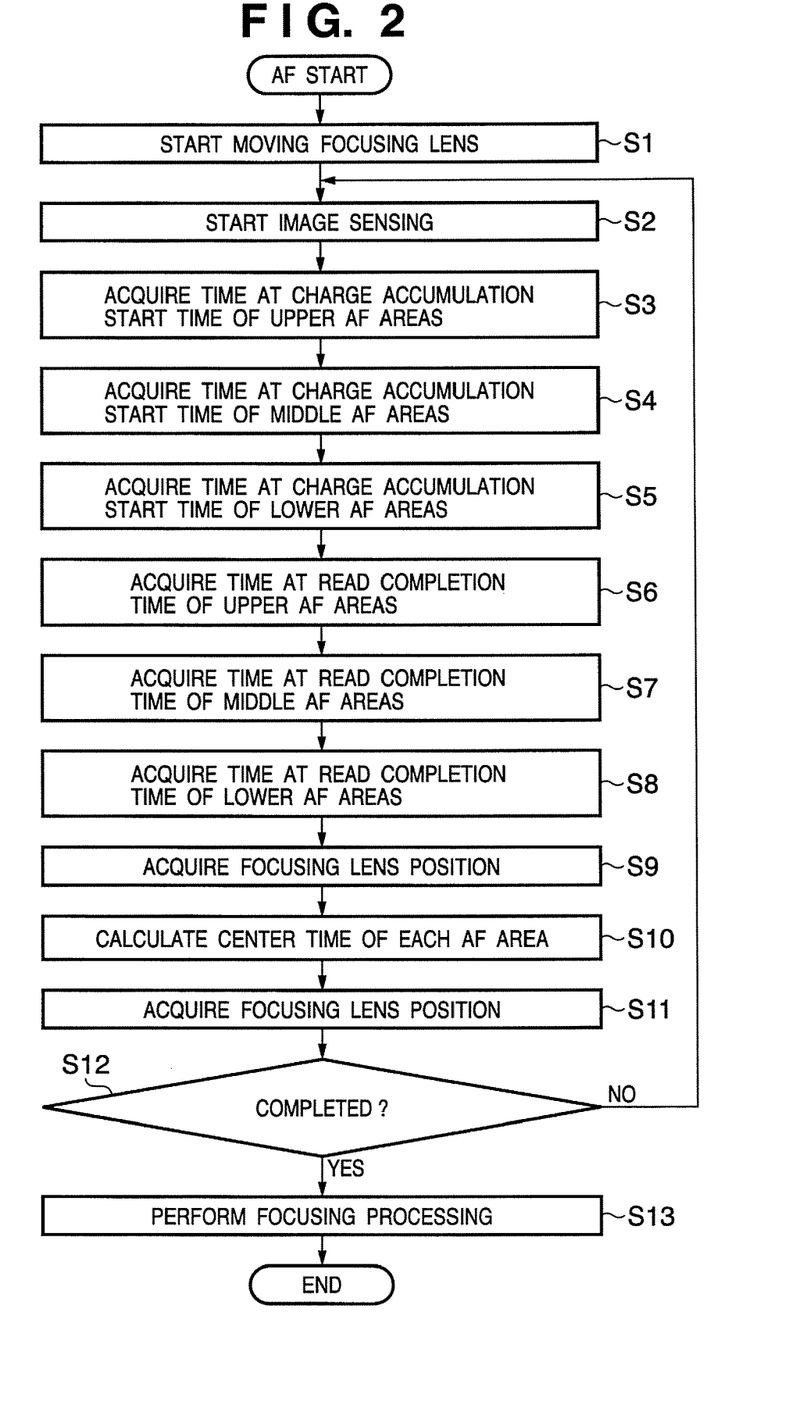
FIG. 2 is a flowchart illustrating autofocus processing according to a first embodiment of the present invention.
Figure 3:
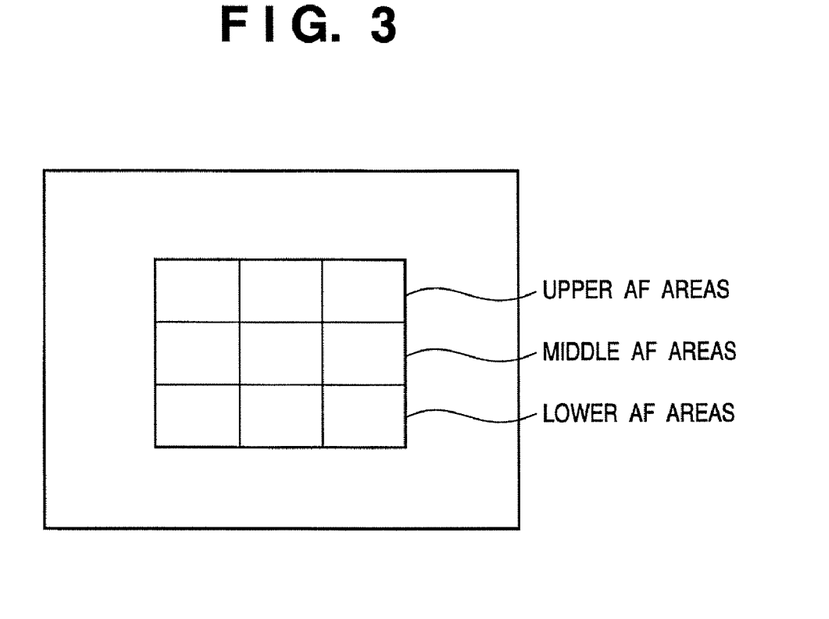
FIG. 3 is a diagram showing an example of the positions of AF areas according to the first embodiment of the present invention.
Figure 4:
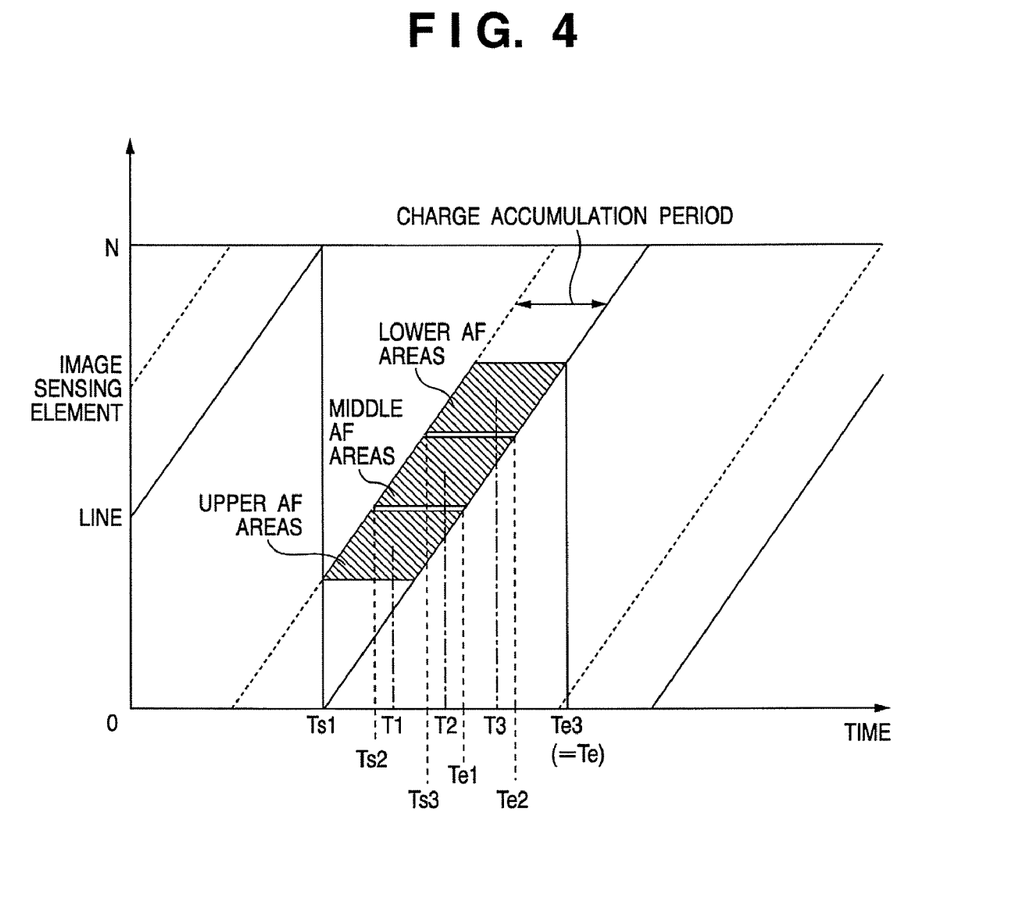
FIG. 4 is a view illustrating the timing for reading image signals from AF areas when performing scanning control of an image sensing element using rolling shutter according to the first embodiment of the present invention.

In step S1 of FIG. 2, movement of the focusing lens 2 is started, and in step S2, image sensing for calculating the AF evaluation value is started. In the first embodiment, since image sensing is performed using the rolling shutter, each of the upper, middle and lower AF areas is exposed at the timing indicated by the half-tone dot meshing shown in FIG. 4. In FIG. 4, similarly to FIG. 7, the slanting broken line shows the scanning position of a reset line, and the slanting solid line shows the scanning position of a read line for the image signal. Therefore, initially, in step S3, a time Ts1 is acquired as the charge accumulation start time of the upper AF areas. Subsequently, in steps S4 and S5, the times Ts2 and Ts3 are acquired as the charge accumulation start times of the middle and lower AF areas, respectively.

Next, in step S6, a time Te1 is acquired as the charge read completion time of the final line of the upper AF areas. Subsequently, in steps S7 and S8, the times Te2 and Te3 are acquired as the charge read completion times of the final lines of the middle and lower AF areas, respectively. The order of acquiring the times of the operations performed in steps S3 to S8 is not limited to the order described above, and the times may be acquired as the events occur. Further, at the charge read completion time of the lower AF areas, in step S9, the current position Pe of the focusing lens 2 is acquired.

In step S10, center times T1, T2 and T3 are obtained by the following formula based on the charge accumulation start times Ts1 to Ts3 and the read completion times Te1 to Te3 for each AF area.

$$T1 = Te1 - (Te1 - Ts1)/2$$

$$T2 = Te2 - (Te2 - Ts2)/2$$

$$T3 = Te3 - (Te3 - Ts3)/2$$

That is, when the center time of each AF area is taken as Ti, the center time can be obtained by $$Ti = Tei - (Tei - Tsi)/2 \quad (1)$$

Here, "i" indicates a vertical order of the position from the top of a frame.

Figure 5:
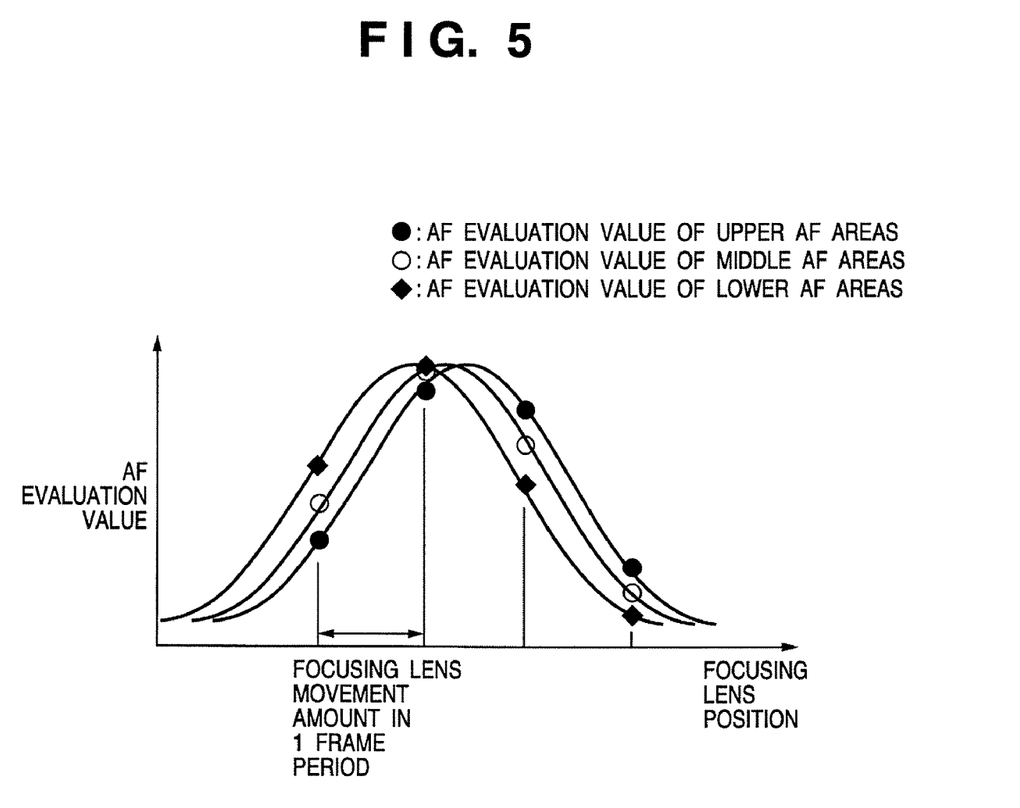
FIG. 5 is a view illustrating an example of deviations of in-focus positions of the respective AF areas when sensing the same object according to the first embodiment of the present invention.

Next, in step S11, the positions of the focusing lens 2 when reading the image signal of each AF area are acquired based on the focusing lens position acquired in step S9. The reason for acquiring the position of the focusing lens 2 for each AF area will be described with reference to FIG. 5. FIG. 5 illustrates an example of sensing of four images of a stationary object while moving the focusing lens 2.

In a case where an object is stationary, when the AF evaluation values of the upper, middle and lower AF areas are represented in a graph taking the focus position Pe acquired in step S9 as the focusing lens positions in that frame image, the resulting graph is as shown in FIG. 5. If the focusing lens 2 is in a stationary state when sensing each frame image, the peaks of the AF evaluation values of the respective AF areas should substantially match. However, in the present first embodiment the focusing lens 2 is continuously moving. Therefore, even if the distance to a stationary object is measured, the position of the focusing lens 2 at the center time of the charge accumulation period (acquisition time of AF evaluation value) of each of the upper, middle and lower AF areas will be different from the position Pe of the focusing lens 2 that was acquired in step S9. Accordingly, the AF evaluation values of the upper, middle and lower AF areas will be different from each other, the peak positions will differ, and the in-focus positions of the upper, middle and lower AF areas look different to each other.

To correct this, specifically, in step S11, positions P1, P2 and P3 of the focusing lens 2 in the upper, middle and lower AF areas, respectively, are obtained from the formula below. The positions are determined based on a time Te at which the focusing lens 2 position Pe was acquired (in this example, it is equal to Te3), the center time of charge accumulation period T1 of the upper AF areas, the center time of charge accumulation period T2 of the middle AF areas, the center time of charge accumulation period T3 of the lower AF areas, and the moving velocity V of the focusing lens 2.

$$P1 = Pe - V \times (Te - T1)$$

$$P2 = Pe - V \times (Te - T2)$$

$$P3 = Pe - V \times (Te - T3)$$

That is, when the position of the focusing lens 2 when reading the image signal of each AF area is denoted by Pi, the position can be determined by $$Pi = Pe - V \times (Te - Ti) \qquad (2)$$

Here, "i" indicates a vertical order of the position from the top of a frame.

The above described correction is performed for each frame each time a focusing lens position is acquired, and in step S12 whether or not to end the image sensing for acquiring AF evaluation values is determined. In this example, it is determined whether or not image sensing of the drivable range of the focusing lens 2 has been completed. When the image sensing is not completed, the next image sensing is started while moving the focusing lens 2 at a predetermined velocity.

In contrast, when image sensing is completed, the process advances to step S13 to perform focusing processing. In the focusing processing, it is determined whether or not focusing is possible based on the focusing lens 2 position and AF evaluation value acquired for each AF area. Further, an AF area to be used is selected and the position to drive the focusing lens 2 to for focusing is determined. Since a conventional in-focus position determination method can be used in step S13, a detailed description thereof is omitted herein.

In the first embodiment, a configuration was described in which an in-focus point is determined after correcting the focusing lens position for each AF area in each image. However, a configuration may also be adopted in which in-focus positions are obtained for each AF area, and the obtained in-focus positions are then corrected by the calculations of the above described formulas (1) and (2).

The processing in this case will be described referring to the flowchart of FIG. 8.

Figure 8:
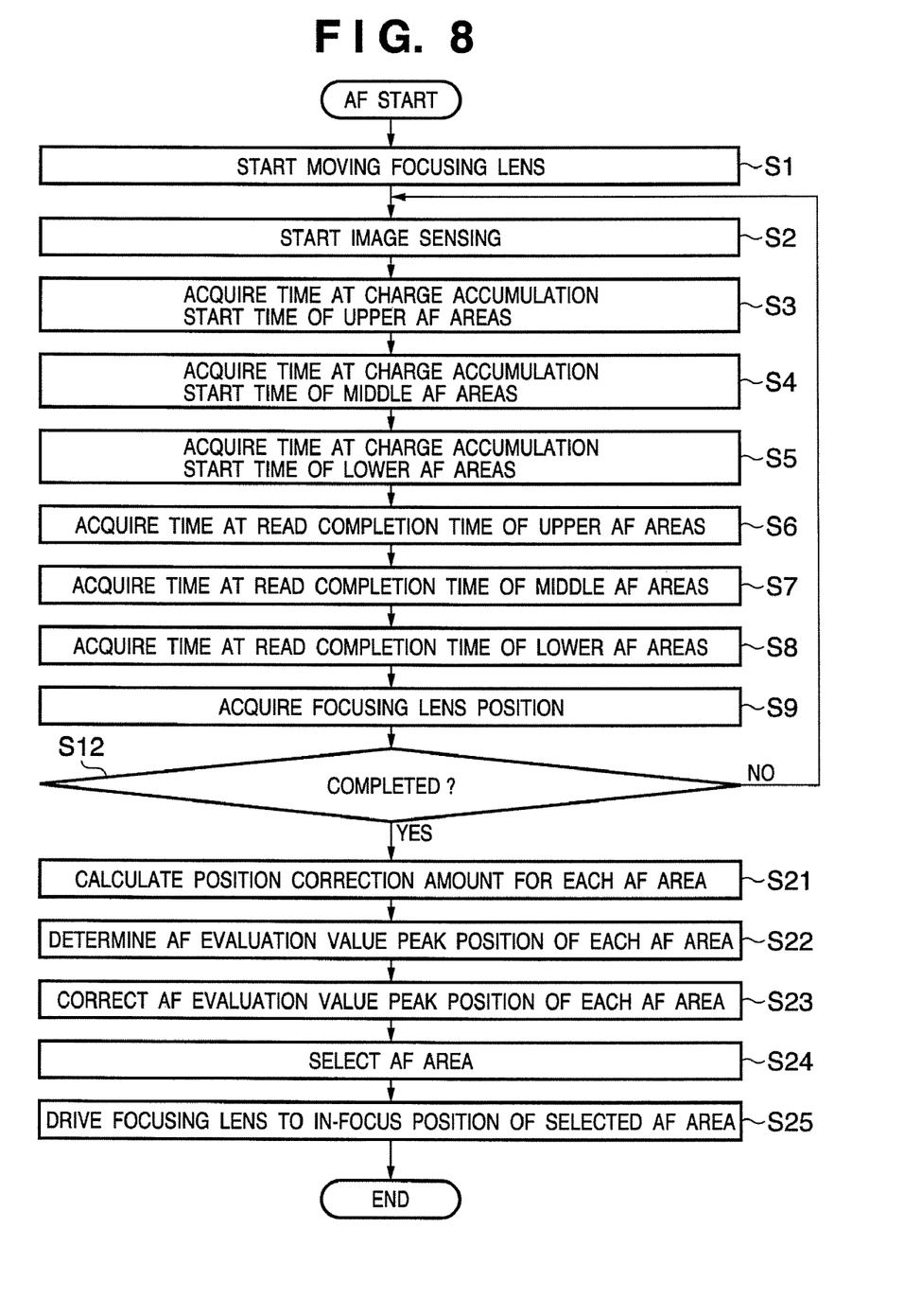
FIG. 8 is a flowchart illustrating autofocus processing according to the first embodiment of the present invention.

In FIG. 8, the processing until step S9 is the same as the processing in the flowchart of FIG. 2, and a description thereof is thus omitted here. Further, unlike the flowchart of FIG. 2, steps S10 and S11 are not performed and a completion decision is made in step S12.

When acquisition of AF evaluation values is completed, in step S21 the position correction amount of each AF area is calculated. For example, the calculation of the above described formulas (1) and (2) is performed using the focusing lens positions and times that were acquired last. This calculation makes it possible to obtain the respective correction amount Pi−Pe of the focusing lens position for the AF evaluation value of each AF area that was acquired last. When the focusing lens is being driven at a constant speed, it is sufficient to determine the correction amount only for the position at which the AF evaluation value was acquired at a certain time as described above, and it is therefore possible to reduce the amount of calculation required for correction.

In step S22, the peak position of the AF evaluation value for each AF area is determined. For example, the peak position may be determined by weighted average using three values consisting of the maximum value and the AF evaluation values on both sides thereof.

In step S23, the peak position of the AF evaluation value in each AF area is corrected. In this case, correction can be carried out by adding the correction amount obtained in step S21 to the peak position in accordance with the position of each AF area.

In step S24, an AF area is selected. For example, the peak position at the shortest distance is selected.

In step S25, the focusing lens is driven to the in-focus position of the selected AF area, i.e. the corrected peak position.

By adopting the above configuration, the correction amounts for peak positions can be determined by one calculation operation when driving the focusing lens at a constant speed.

The present first embodiment described a case in which the focusing lens position was determined upon completion of the charge accumulation period of the lower AF areas. However, the present invention is not limited thereto, and a configuration may also be adopted that, taking as a reference a focusing lens position in an arbitrary AF area, acquires a focusing lens position using the difference between the focusing lens position acquisition time in that AF area and the center time of each AF area. Naturally, a configuration may also be adopted that, taking as a reference a focusing lens position at an arbitrary time during the image sensing of each frame, and correcting the focusing lens position using a difference with the center time of each AF area.

Further, although the AF accuracy decreases to some extent compared to the case of acquiring both times, the center time of an AF distance measurement point may be determined in the following manner. More specifically, first, only the charge accumulation start times of steps S3 to S5 or the read completion times of steps S6 to S8 are acquired. Subsequently, a time obtained by adding or subtracting a time that is half the amount of the charge accumulation period to or from the charge accumulation start time or read completion time is used as the center time of each AF area.

As described in the foregoing, according to the first embodiment, since it is possible to acquire an appropriate in-focus position in each AF area, the AF accuracy can be maintained.

Second Embodiment

Next, the second embodiment of this invention will be described.

Figure 6:
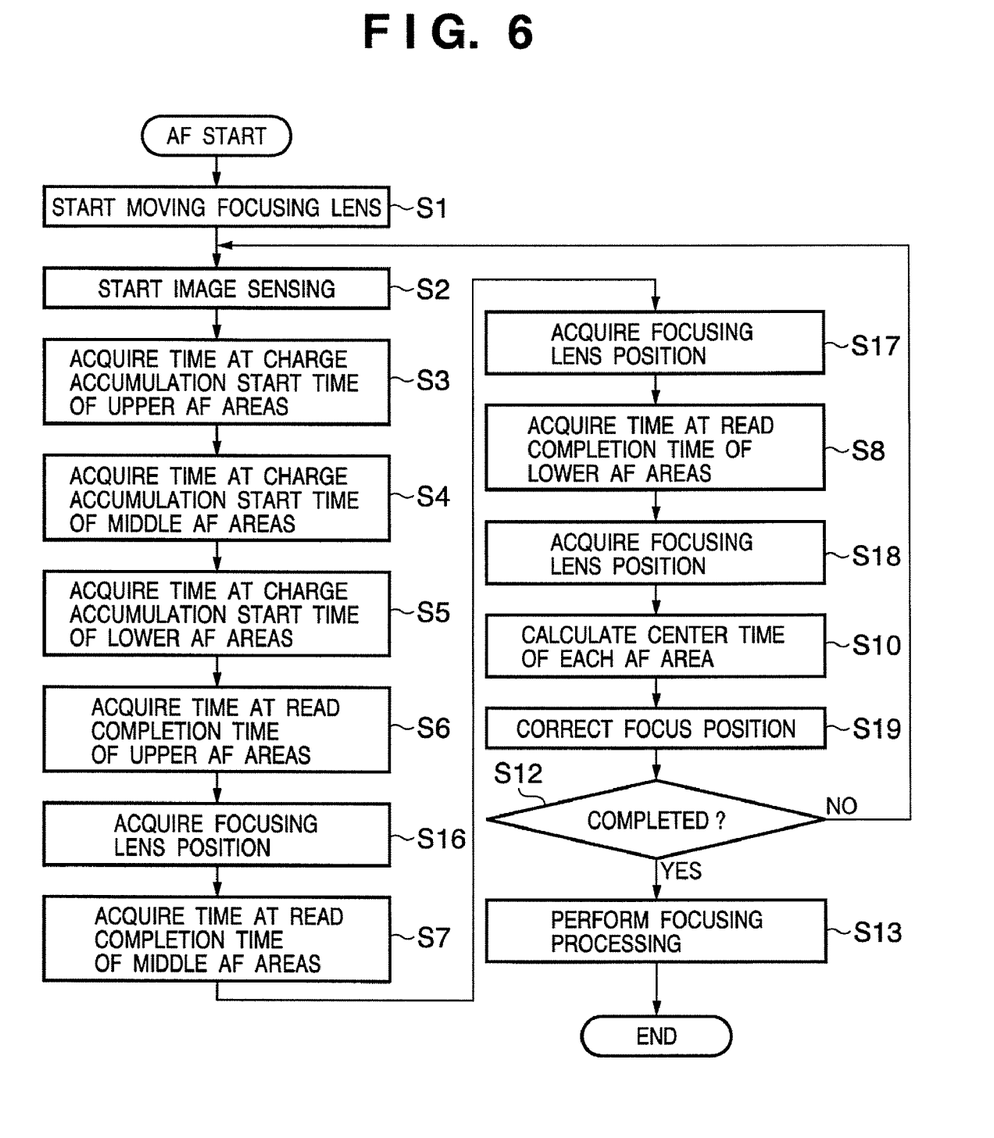
FIG. 6 is a flowchart illustrating autofocus processing according to a second embodiment of the present invention.

FIG. 6 is a flowchart that illustrates a correction method for a focusing lens position according to the second embodiment. In FIG. 6, processing steps that are the same as processing steps in the flowchart of FIG. 2 are denoted by the same reference numerals as FIG. 2. Hereunder, only processing that is different to the processing shown in FIG. 2 is described.

The processing shown in FIG. 6 differs in the following points from the processing described with reference to FIG. 2. The time (Te1, Te2, Te3) of reading the final line in each of the upper, middle and lower AF areas is acquired in steps S6, S7 and S8, and at the same time, the positions (Pe1, Pe2, Pe3) of the focusing lens 2 at those times are acquired in steps S16, S17 and S18.

In steps S16, S17 and S18, the positions (Pe1, Pe2, Pe3) of the focusing lens 2 in the respective upper, middle and lower AF areas are acquired. Further, in step S19, the positions P1, P2 and P3 of the focusing lens 2 in each of the upper, middle and lower AF areas, respectively, are obtained by the formula below. The positions are determined on the basis of the times (Te1, Te2, Te3) the positions (Pe, Pe2, Pe3) of the focusing lens 2 were acquired, the center times T1, T2 and T3 of the respective upper, middle and lower AF areas, and the moving velocity of the focusing lens 2.

$$P1=Pe1-V\times(Te1-T1)$$

$$P2=Pe2-V\times(Te2-T2)$$

$$P3=Pe3-V\times(Te3-T3)$$

That is, when the position of the focusing lens 2 in each AF area is denoted by Pi, the position can be obtained by $$Pi=Pei-V\times(Tei-Ti)$$

Here, "i" indicates a vertical order of the position from the top of a frame.

The example illustrated in FIG. 6 describes a case in which the position of the focusing lens 2 is acquired at the time of reading the final line of the respective upper, middle and lower AF areas. However, naturally a configuration may also be adopted in which the position of the focusing lens 2 is acquired when starting charge accumulation of the AF area.

As described in the foregoing, according to the method of the second embodiment it is possible to acquire the appropriate in-focus position in each AF area, and thus the AF accuracy can be maintained.

As many apparently widely different embodiments of the present invention can be made without departing from the spirit and scope thereof, it is to be understood that the invention is not limited to the specific embodiments thereof except as defined in the appended claims.

The invention claimed is:

1. A focus control method that carries out focusing control by sensing a plurality of images of an object while moving a position of a focusing lens and determining in-focus positions of auto focusing areas that are located at a plurality of positions, comprising:
  a first acquisition step of acquiring read times at which image signals of the respective auto focusing areas are read;
  a second acquisition step of acquiring a focusing lens position and a time at which the focusing lens position is acquired;
  a position calculation step of determining focusing lens positions at the read times of the image signals of the respective auto focusing areas based on the read times of the respective auto focusing areas that are acquired in said first acquisition step and the focusing lens position and time that are acquired in said second acquisition step;
  an evaluation value calculation step of calculating evaluation values that represent degrees of focused states of the respective auto focusing areas based on the image signals of the respective auto focusing areas; and
  an in-focus position calculation step of calculating an in-focus position of the focusing lens based on the focusing lens positions that are determined in said position calculation step and the evaluation values of the respective auto focusing areas that are calculated in said evaluation value calculation step.

2. The focus control method according to claim 1, wherein a midpoint between a charge accumulation start time and a read completion time of each of the auto focusing areas is determined as a read time in said first acquisition step.

3. The focus control method according to claim 2, wherein the focusing lens position is acquired at a timing of either a charge accumulation start time or a read completion time of any one of the plurality of auto focusing areas in said second acquisition step.

4. The focus control method according to claim 2, wherein the focusing lens position is acquired at a timing of either a charge accumulation start time or a read completion time of each of the auto focusing areas in said second acquisition step.

5. The focus control method according to claim 1, wherein the focusing lens position and time are determined at an arbitrary timing during reading of image signal of each image in said second acquisition step.

6. A focus control method that carries out focusing control by sensing a plurality of images of an object while moving a position of a focusing lens and determining in-focus positions of auto focusing areas that are located at a plurality of positions, comprising:
  a first acquisition step of acquiring read times at which image signals of the respective auto focusing areas are read;
  a second acquisition step of acquiring a focusing lens position and a time at which the focusing lens position is acquired;
  an evaluation value calculation step of calculating evaluation values that represent degrees of focused states of the respective auto focusing areas based on the obtained image signals;
  an in-focus position calculation step of calculating in-focus positions of the focusing lens of the respective auto focusing areas based on the focusing lens position acquired in said second acquisition step and the evaluation values of the respective auto focusing areas that are calculated in said evaluation value calculation step;
  a correction step of correcting the in-focus positions of the respective auto focusing areas based on the read times of image signals of the respective auto focusing areas that are acquired in said first acquisition step, the focusing lens position and time that are acquired in said second acquisition step, and the in-focus positions of the auto focusing respective areas calculated in said in-focus position calculation step; and
  an in-focus position determination step of determining an in-focus position of the focusing lens based on the in-focus positions that are corrected in said correction step.

7. A focus control unit that carries out focusing control by sensing a plurality of images of an object while moving a position of a focusing lens and determining in-focus positions of auto focusing areas that are set at a plurality of positions, comprising:
  a position calculation unit that acquires read times at which image signals of the respective auto focusing areas are read and a focusing lens position and a time at which the focusing lens position is acquired, and determines focusing lens positions at the read times of the image signals of the respective auto focusing areas based on the read times of the auto focusing areas and the focusing lens position and time;
  an evaluation value calculation unit that calculates evaluation values that represent degrees of focused states of the respective auto focusing areas based on the image signals of the respective auto focusing areas; and
  an in-focus position determination unit that determines an in-focus position of the focusing lens based on the focusing lens position that is acquired by said position calculation unit and the evaluation values of the respective auto focusing areas that are calculated by said evaluation value calculation unit, wherein the focusing lens position and time are determined at an arbitrary timing during reading of image signals of each image.

8. The focus control unit according to claim 7, wherein the plurality of images of the object are sensed by an image sensing element that reads image signals accumulated at different timings from a plurality of pixels that are arranged two-dimensionally while moving the position of the focusing lens.

9. The focus control unit according to claim 7, wherein said position calculation unit determines a midpoint between a charge accumulation start time and a read completion time of an accumulated charge of each of the auto focusing areas as a read time.

10. The focus control unit according to claim 9, wherein the focusing lens position is acquired at a timing of either a charge accumulation start time or a read completion time of any one of the plurality of auto focusing areas.

11. The focus control unit according to claim 9, wherein the focusing lens position is acquired at a timing of either a charge accumulation start time or a read completion time of each of the auto focusing areas.

* * * * *